United States Patent
Lloyd

(10) Patent No.: US 9,325,741 B2
(45) Date of Patent: Apr. 26, 2016

(54) METHOD AND SYSTEM FOR EVALUATING ACCESS GRANTED TO DYNAMICALLY PROVISIONED VIRTUAL SERVERS ACROSS ENDPOINTS IN A NETWORK

(71) Applicant: RedSeal Networks, Inc., Sunnyvale, CA (US)

(72) Inventor: Michael A. Lloyd, Belmont, CA (US)

(73) Assignee: RedSeal, Inc., Sunnyvale, CA (US)

( * ) Notice: Subject to any disclaimer, the term of this patent is extended or adjusted under 35 U.S.C. 154(b) by 0 days.

(21) Appl. No.: 14/634,411

(22) Filed: Feb. 27, 2015

(65) Prior Publication Data

US 2015/0180906 A1    Jun. 25, 2015

Related U.S. Application Data

(63) Continuation-in-part of application No. 14/524,887, filed on Oct. 27, 2014.

(60) Provisional application No. 61/901,271, filed on Nov. 7, 2013.

(51) Int. Cl.
*H04L 29/06* (2006.01)
*H04L 12/24* (2006.01)

(52) U.S. Cl.
CPC .............. *H04L 63/20* (2013.01); *H04L 41/145* (2013.01); *H04L 63/102* (2013.01)

(58) Field of Classification Search
CPC ........................................................ H04L 63/20
USPC ........................................................ 726/1, 6
See application file for complete search history.

(56) References Cited

U.S. PATENT DOCUMENTS

2015/0082399 A1*   3/2015   Wu ..................... G06F 21/6209
                                                                          726/6

* cited by examiner

*Primary Examiner* — Jacob Lipman
(74) *Attorney, Agent, or Firm* — Kilpatrick Townsend & Stockton LLP; Kenneth R. Allen

(57) ABSTRACT

A network analysis tool is provided in support of a data communication network having dynamically provisioned devices at indeterminate endpoints wherein templates, namely, the collection of meta-data about dynamically provisioned devices on a network (beyond the conventional networking concept of an endpoint address), are modeled as fixed endpoints for purposes of tracking. In a specific embodiment, template groups are generated as network interfaces for a modeled template enforcement device, and template groups are represented as if they are network endpoints connected to a template enforcement device, and a device description for the template enforcement device is produced.

8 Claims, 4 Drawing Sheets

METHOD AND SYSTEM FOR EVALUATING ACCESS GRANTED TO DYNAMICALLY PROVISIONED VIRTUAL SERVERS ACROSS ENDPOINTS IN A NETWORK

CROSS-REFERENCES TO RELATED APPLICATIONS

This application claims benefit under 35 USC 119(e) of U.S. provisional patent application Ser. No. 61/901,271 filed Nov. 18, 2013, and of nonprovisional patent application Ser. No. 14/524,887, filed Oct. 27, 2014, the contents of which are incorporated herein by reference in their entirety.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to network security and in particular to methods for determining access for dynamic servers, as herein understood, in network data communication. More particularly this invention relates to end-to-end network modeling extended to incorporate and properly model the capabilities for template-based generation of virtual servers in networked equipment. As herein used, "template-based provisioning" refers to the identification associated with metadata about a dynamically provisioned endpoint of a network, beyond the conventional networking concept of a static endpoint address for a node.

By this application, the concepts of identifying users at dynamic endpoints by identifying users with user devices has been extended to dynamically provisioned virtual servers. Known Information Technology (IT) networks use Internet Protocol (IP) addressing to enable communication. Multiple devices make decisions about IP packet headers (and sometimes message content), including devices such as routers and firewalls. These devices interact in complex ways, making it difficult for IT staff to correctly predict or understand end-to-end effects. As an example, when access is blocked between two locations, the immediate issue is: Why is it blocked? Is it a deliberate decision of a security device (which is configured to prevent this access and others), or is it an unintentional failure of the intervening equipment? Alternately, if access is allowed, why is it allowed—what path does it follow? These issues may appear to be simple, but networks are explosively complex. Similar to the game of chess, the number of rules is modest, but the number of possible combinations is extremely large, which presents a formidable barrier to understanding.

Modern endpoint provisioning technologies, including cloud, private, and hybrid virtualized data centers, add significant additional complexity to the existing issues in understanding network access and control. This also presents a barrier to understanding. Neither the added technology nor existing selected technologies need to be particularly complex. By way of analogy, consider adding one more rules to chess. Since the game is already complex to play with a simple rule set, adding even a simple rule can make the game even more difficult to analyze.

In response to such increase in complexity, technologies have been developed to model complex networks in order to answer key questions for network designers, builders and operators. These technologies model the individual rules of multiple devices to see how they interact as an end to end system. Key to these products is the modeling of interaction. This modeling is not just how one rule or one device operates, but it is aimed at determining how a whole system behaves in aggregate. The chess analogy applies: It is easy to analyze the rules for how one chess piece is allowed to move, but it is difficult to analyze a whole chess match. Likewise, the subject techniques do not deal merely with individual devices, but rather with complex, interacting sets of devices. Herein, these products are referred to as "end to end network modeling" technologies. Examples of techniques of this category have been incorporated into commercial products offered by the assignee of the present invention, and they are marketed under the names Network Advisor and Vulnerability Advisor, but examples also include the products offered by Skybox Security, Athena Security, FireMon, and others. This active market space focuses particularly on security questions in "end to end modeling." There are other, related spaces for technologies focused on green-field design, or operational availability questions. Examples of vendors of such products include OpNet Technologies, Netsys Technologies, and the Wide Area Network Design Laboratory.

One of the challenges in the field of end-to-end network modeling is the rapid pace of technological changes in the network components. Many new network capabilities are evolutions of existing methods, but others represent a concept shift in how end-to-end connectivity is created or controlled. One area of recent innovation (and which is not prior art to the present invention) has been the incorporation of "template-based provisioning," as herein defined, for the purpose of dynamic provisioning of network endpoints (often, but not exclusively, servers residing in virtualized data centers). For example, administrators may be provided with tools to describe "new web servers in classXshould use template Y," meaning that any future servers dynamically added to the network at a given endpoint will inherit properties from template Y. This template Y can in turn specify diverse properties of the server, including (but not limited to) network access policies, permitting or denying network flows. Of particular note here is the aspect that security rules—key to the end-to-end network modeling systems underlying this invention—are not associated with a pre-defined, known network endpoint. Rather, the template describes rules which will be associated later with one or many actual endpoints, as servers are added or removed using the template. Modeling this dynamic variation of the endpoint actually associated with the rules is the subject of the current invention.

The core behavior of an end-to-end network modeling technology is the computing of access between two endpoints across the network. However, the core challenge with "template-based provisioning" technologies, as herein defined, is that in a network they do not deal with endpoints, that is, in the course of a day, for example, a single template may be used to configure multiple different network endpoints, and so the set of endpoints associated with a template can fluctuate. Rules about the template are relatively statically allocated, but highly dynamic on the network itself, as the currently active set of servers using a given template changes.

Networking equipment products that deal with provisioning of endpoints from templates generally work in a specific local area. In other words, the products enforce policy locally, often endpoint by endpoint, including dynamic state that relates the relatively static templates to one or more endpoints. This mapping of a template to an endpoint or session is ephemeral: it is generally held as dynamic state in the controller of the virtualized instances. That is, there are associations of two main sorts: a first association of currently active network endpoints to templates, and a second association of security rules to those groups. The first form of association, mapping endpoints to groups, generally occurs on the virtual server control point. The second association, tying the group to a behavior or set of access rules, is typically configured on the server control point and is much less dynamic. Product literature and published art often refer to "dynamic policies" in this context, but the dynamism is in the first class of association—the mapping of endpoints to templates. The behavior for the group is typically more static, in that they are held in configured rules that are changed occasionally by operations staff.

Collecting live data on the current endpoints in a dynamic template-based provisioned environment involves substantial practical challenges and operational burdens, while the static rules are generally available to existing protocols and tools that are already capable of gathering non-template-based rules from similar equipment.

In previous end-to-end network modeling (that is not prior art to this invention), typical analysis results include the response to queries regarding what access is possible between one endpoint and another endpoint, or regarding the access means permitted across the network. This involves understanding the various interacting technologies between the two endpoints. This is a complicated technical process in itself, but it depends fundamentally on having endpoints or a set of endpoints in the model. Modern devices controlled by template-based provisioning systems, such as virtualized data centers, are extremely fast-moving, making it technically difficult and expensive to gather instant by instant telemetry on every endpoint as it is added or removed from the network, frustrating the ability of operations staff to benefit from the end-to-end modeling capabilities.

What is needed is a mechanism to increase the accuracy of identification as herein defined in such dynamic environments.

SUMMARY

According to the invention, a network modeling scheme is provided in support of a data communication network having dynamically provisioned participants whose network endpoint is not specified in advance. Instead, they are configured according to template-based rules that do specify network access rules for the dynamically provisioned endpoints. The template itself is modeled as a fixed endpoint of the network, treating the template as if it can communicate as an endpoint on the network, whether any endpoints are known to be currently provisioned or not. To this end, templates are modeled as network locations. A split in rule types is invoked to recognize the relatively dynamic mapping of endpoints to template groups and to distinguish dynamic mapping from comparatively static rules applied to template groups. To apply this distinction to end-to-end network modeling, the template groups are treated as structural objects as if they were objects such as "subnets" or "endpoints." These templates may look like or act like servers for example, and may be referred to as such. Accordingly, the modeling process focuses on the groups or sets on which the policies are enforced, which may not correspond one-to-one with current endpoint instances per se, but which are stable and uniquely defined enough to perform as a type of "endpoint" in an end-to-end model. More particularly, a first domain is defined to track which endpoints are currently active with associated templates at which locations on the network. A second domain is defined to examine the structure of the template groups at the enforcement points, investigating whether these are configured correctly (in conjunction with the rest of the network) so that future or current endpoints in the actual communications network will be able to obtain the intended access.

In some embodiments of the invention, the first challenge (tracking current endpoints) need not be performed at all. There is significant utility in focusing solely on the second problem (analyzing template groups and associated configurations in context of a whole network). In other embodiments, both challenges may be addressed with an ideal implementation expressing both steps, namely separating the ephemeral "who is connected where now?" step from the relatively static step and question: "Which rules apply to endpoints (of unspecified location) who connect now or in the future?"

The invention enables extensions of an end-to-end network modeling system to model template-based provisioning approaches. Prior to use of the present invention, the end-to-end network modeling system used properties of the known endpoints and the network to compute and display whether network access is permitted or not. For one specific example, an IP-based end-to-end network modeling system may show whether a given IP endpoint can exchange communication over a given TCP/IP protocol with another IP endpoint. By contrast, with the invention, this modeling can incorporate technologies in the actual network that perform "template-based provisioning," which by definition is not a standard property of the network communication. Templates are properties associated with one or several instances, and the rules for the template apply wherever the endpoint of those instances turns out to be. The "template" is usually permitted, in the actual network, to show up in more than one address at a time, and/or over more than one device at a time, and/or to move over time from one address to another.

In the following detailed description, reference is made to the accompanying drawings which form a part hereof wherein like numerals designate like parts throughout, and in which is shown by way of illustration specific embodiments in which the invention may be practiced.

DETAILED DESCRIPTION

Figure 1A:
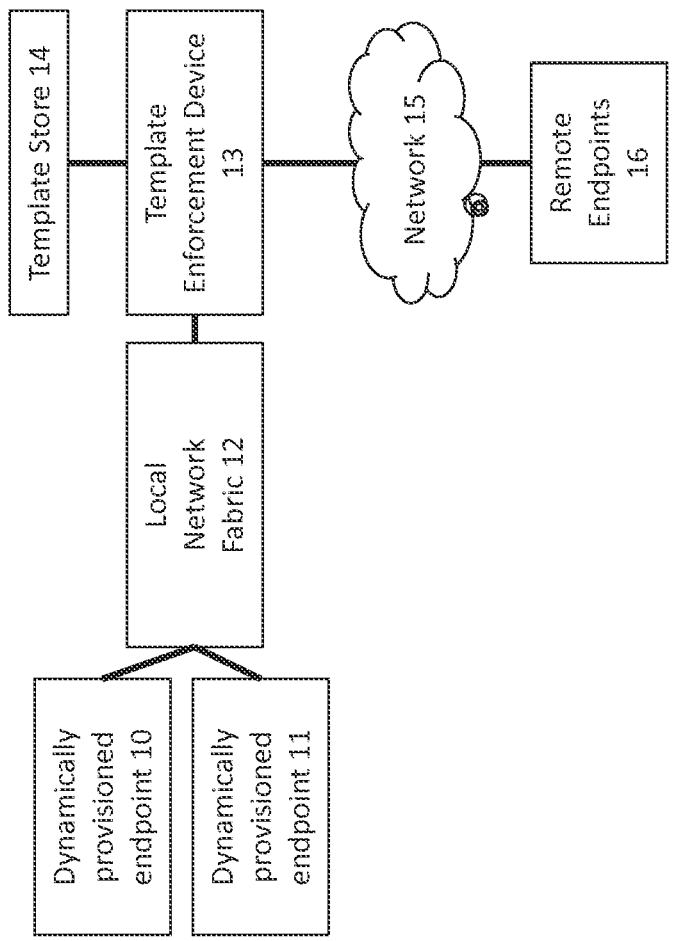
FIG. 1A is a functional block diagram of an actual communication network showing relevant functional elements according to the invention.

The following terms are used in connection with this disclosure as terms of art. These terms should be familiar with those of skill in the art.

Template: A "container" found in systems for dynamic provisioning of endpoints, describing properties of any endpoints that can be built, including (as non-limiting examples)

operating system, software, applications to execute, and network access policies. These containers permit expression of policy, such as "endpoints in Group X are permitted (or denied) access to endpoint Y." This policy is separate from the network addressing or location of endpoints that are provisioned—the rules are relatively static but are attached to dynamic endpoints wherever they may be instantiated.

Template interface: A modeled item in the end-to-end network analysis system. An interface generally shows a connection between elements; typically, in an end-to-end network analysis system, an interface is used to represent the connection between a local area network domain and a connected router or similar network device. (The notion of a "template" interface" is a key part of the invention—the creation of a connection point between the abstract concept of the template group and the wider network.) This interface generally does not exist in the real network, but it is added according to the invention to show where the dynamically provisioned endpoints users are first evaluated for their specific access rights, at the template enforcement point.

Device configuration data: The conventional description of the settings on any of a class of network devices. This is one of the standard inputs to an end-to-end network modeling system.

Standard IP Interface: A standard interface for connection between a network area and a forwarding network device. When the interface has an associated Internet Protocol address, it is known as a "Standard IP Interface."

Access rule: A statement permitting or blocking flows of a given type at a given location in a network. For example, any typical network forwarding device can be configured to permit or to discard certain classes of traffic, based on properties observed in the traffic. Template enforcement points or nodes also apply access rules, but they can operate on rules outside the communication content itself, including the template of dynamically provisioned endpoint set up to use that template.

Endpoint: A location on a network intending to communicate with another such endpoint. (In conventional Internet Protocol networks, an endpoint receives one or more IP addresses.)

End to End: Used to differentiate two classes of analysis methods applied to networks. One class isolates individual devices or configuration details to ask "what does this element do?" or "is this element configured appropriately?" This is referred to as "element management." Another class of system-wide analysis systems exists, which is the subject of this invention. They are referred to as "end to end" because they consider much or all of the network path between two endpoints—not just one device at a time, but instead considering all the complex, interacting elements that add up to either permit or block some endpoint communication.

Figure 1B:
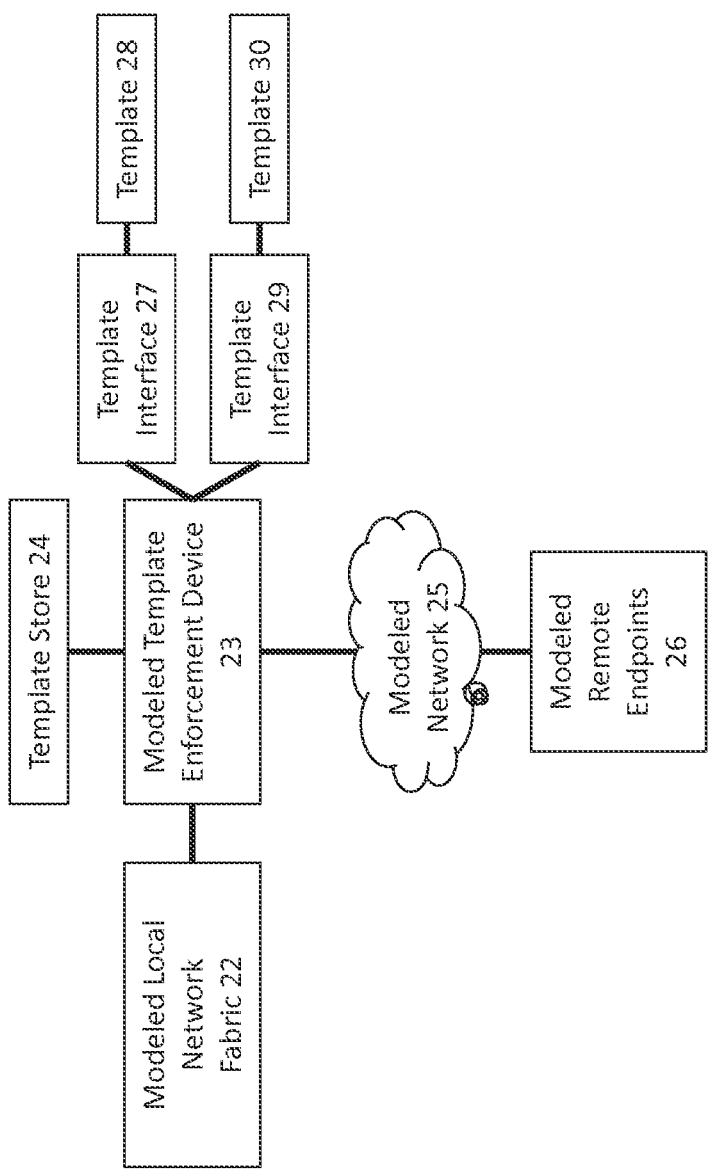
FIG. 1B is a functional block diagram of a model of the actual communication network of FIG. 1A showing the use of templates as a substitute for endpoints in accordance with the invention.

FIG. 1B illustrates the invention, a modeling scheme, to be compared to FIG. 1A, which is the actual network modeled by the invention. The depiction of FIG. 1A is representative of a real-world environment, including two endpoints 10 and 11 which were provisioned dynamically, and are communicating across local network 12, over network 15, and to remote endpoints 16. Note that the set of endpoints can change rapidly, and there may be no explicit connection of the endpoint to the template used, and attendant policies, outside the template enforcement device 13. This presents difficulty for conventional end-to-end modeling, since the endpoints now have significant access permissions that are not visible as properties of the endpoint that was provisioned. The template enforcement device 13 is therefore tracking two separable state tables: first, the template in use at any given dynamically provisioned endpoint, and second, the policies that apply to all members of each template known in template store 14. The template enforcement device 13 can then apply access policy on transmitted data (typically packets) sent by dynamically provisioned endpoints such as 10 and 11, permitting or denying access to the wider network 15, depending on the access rules associated with each endpoint. Those skilled in the art will recognize a variety of possible implementations.

FIG. 1B shows the invention herein applied to a typical end-to-end network modeling system. Many of the endpoints correspond directly—for example modeled network 25 corresponds to network 15 in the real network, modeled network fabric 22 corresponds to network fabric 12 in the real network, and so on. In the invention, actual physical devices may be employed for each element, or simulations may be employed for physical elements. The difference between the model and the real network that is modeled is the addition of templates 28 and 30 for one or more actual templates or other dynamically provisioned devices such as a server 10, in the form of template 28 and template 30 coupled according to the invention by logical template interfaces 27, 29 to the template enforcement device 23. The templates 28, 30 represent two of the many possible templates known to template enforcement device 13 modeled as template enforcement device 23. Rather than representing endpoint 10 directly, the invention adds sufficient template objects to the modeled enforcement device 23 the set of possible configurations of the endpoint 10 that can connect to the enforcement device 13 of FIG. 1A. This is done in the form of the roles 28 and 30 connected via the virtual interfaces 27, 29 that "spoof" local endpoints as viewed by the modeled template enforcement device 23.

The invention described herein does not preclude representing endpoints 10 and 11 directly; however, the invention does decompose the problem of the access granted to endpoints 10 and 11 into two components, one of which is the dynamic association of endpoints 10 and 11 to a varying set of templates, and the other of which is the relatively static template policies enforced at template enforcement device 13 in the real network, and represented in the end-to-end network modeling system via the template objects 28 and 30 through the interfaces 27 and 29.

Figure 2:
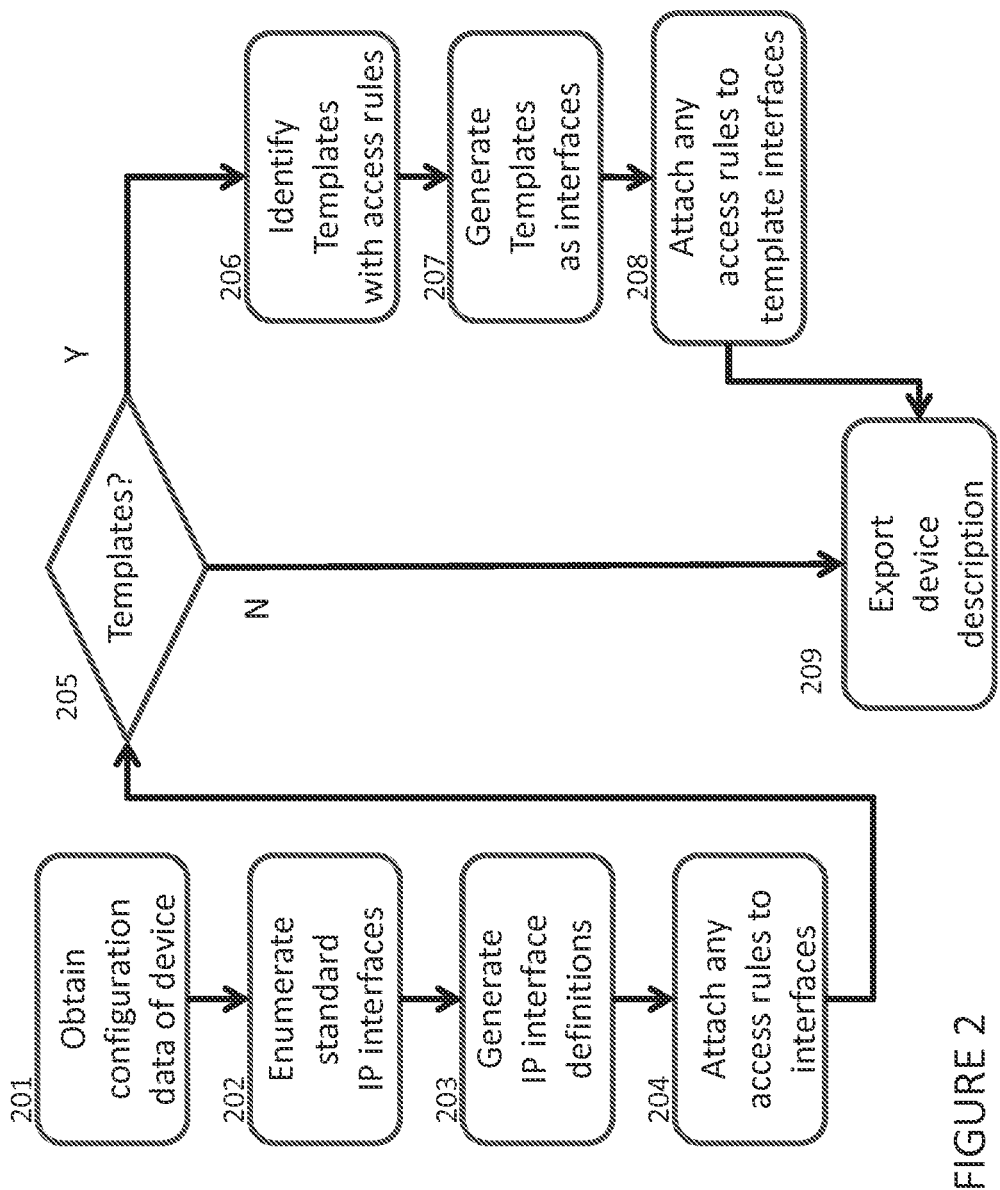
FIG. 2 is a flow chart of a method according to the invention.

To perform the method according to the invention, the steps illustrated in FIG. 2 are invoked. These steps may be programmatically implemented in a digital computer as part of the network model of FIG. 1B. The network model system first obtains configuration data of the device (step 201), enumerates standard IP interfaces (Step 202), generates IP interface definitions (Step 203), and attaches any access rules to the interfaces (Step 204). The system then tests to determine if there are any templates for dynamically provisioned endpoints, in the sense used herein (Step 205). If not, the system exports the device description using the conventional representation of the end-to-end network modeling system (Step 209). If yes, the system identifies templates with access rules (Step 206), then generates the templates as interfaces or connections to the template enforcement device 25t (Step 207) and attaches any access rules to the template interfaces (Step 208). Thereafter, the system exports the device description for each template enforcement device (Step 209).

Figure 3:
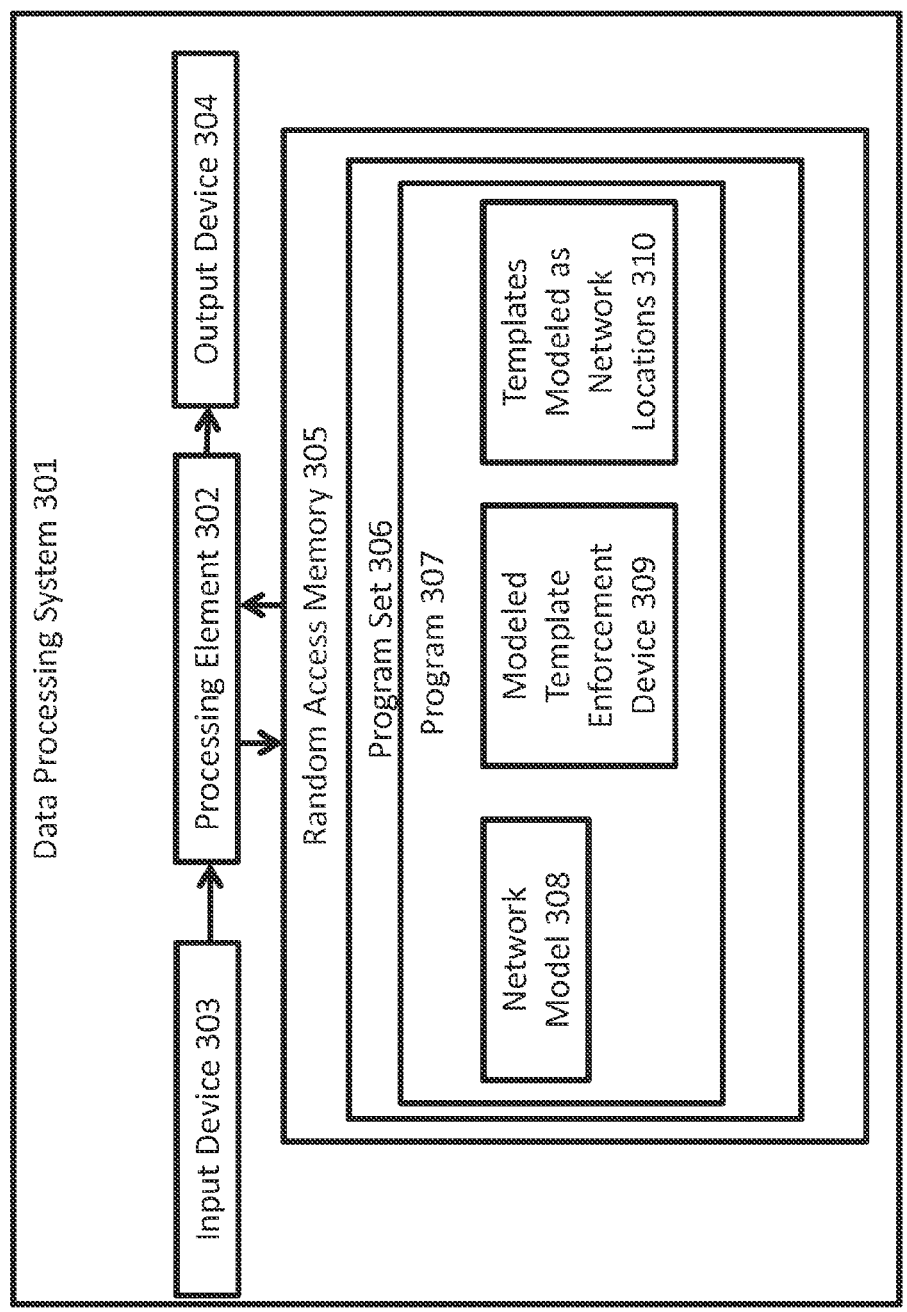
FIG. 3 is a block diagram of the components of a diagnostic tool having components that operate in accordance with the invention.

The invention could be implemented in either hardware in the structure of FIG. 1B or in software wherein the components are implemented as processes in a general purpose data processing system 301, as illustrated in FIG. 3, which has a processing element 302 such as a central processing unit or distributed or parallel processor array. An input device 303 serves as the input interface with the input endpoints, and an output device 304 serves as the interface to the network 27 (FIG. 2B). A random access memory 305 provides the processing element 302 with access to data and a program set 306. The program set 306 according to the invention includes a network model 308, a modeled template enforcement device 309 and templates modeled as network locations 310 including the template interface function as herein explained. The program 307 with network model 308 would typically include a network map having endpoints and representations of a communication medium. The program 307 is built upon a set of rules 340 that control the system 301. The processing element serving as the model controller is configured by the program 307 to split rule types between dynamic mapping rule types and comparatively static rule types in order to recognize relatively dynamic mapping of endpoints to templates. The model controller is further configured to permit the model to distinguish between dynamic mapping rules and comparatively static rules applied to templates.

As an illustrative example of how the invention operates (but not a limitation), consider a company with two dynamically provisioned sets of servers—Web Servers and Database Servers. Suppose the company also wants to limit access to/from the Database Servers, but permits much wider access to the Web Servers. Suppose also that the set of servers in either group can change dynamically, as load comes and goes. Common examples of such dynamic provisioning systems are described in the industry as provisioning Virtual Data Centers that are elastic under load—as business requirements change, new servers can be added, or old ones removed and even repurposed, at high speed. This in turn means that specific endpoints in the network may change role rapidly, being used for an instance of the Web Servers template at one instant, but changing to a Database Server instance at a later time. This dynamism makes security policies harder to control, and as a result, the vendors of equipment for running Virtual Data Centers insert the abstraction of the Template for each group, and allow administrators to attach policies to these templates. The subject matter of this invention is a practical method to update a different class of technologies, concerned with end to end modeling of the network infrastructure, to render these templates as if they are network endpoints.

A method according to the invention comprises modeling, using a processing element and random access memory storing a program set, a data communication network having dynamically provisioned endpoints derived from templates, the program set including a network model, a modeled template enforcement device and templates modeled as network locations, and employing the templates to determine, from the modeling step, access granted by the modeled template enforcement device to the dynamically provisioned endpoints in the network model with respect to real endpoints in a portion of the real network. The method may further be defined in that the employing step comprises utilizing a template interface added to the modeled template enforcement device as if network traffic originated at the template interface. Further, the modeling step and the employing step may comprise obtaining configuration data of the modeled template enforcement device associated with the real endpoints, generating interface definitions for each endpoint from standard interfaces in order to establish a device interface, thereafter testing for templates and if none exists, exporting a device description of the device, and if templates exist, identifying templates with access rules, then generating templates as template interfaces for the modeled template enforcement device and producing a device description; and then exporting the device description of the device.

The method may further be defined in that, after the generating step and prior to the testing step, attaching optional access rules to the template interfaces. The basic method may be further refined in that the templates employing step includes defining dynamic mapping rules applied to dynamically provisioned endpoints, defining static rules applied to templates, and distinguishing between the dynamic rules and the static rules during determining access.

The invention has now been explained with reference to specific embodiments. It is to be understood that other embodiments may be utilized and structural or logical changes may be made without departing from the scope of the present invention. Therefore the invention is not intended to be limited, except as indicated by the appended claims and their equivalents.

What is claimed is:

1. A data processing system for modeling access between endpoints of a real data communication network comprising:
   a processing element;
   random access memory for nonvolatile storage for a program set for modeling, and for data associated with the modeling, of the real data communication network;
   at least one input interface device for receiving configuration information about the real data communication network;
   said program set including a model of a portion of the real data communication network, the model including a representation of a template enforcement device and an element for modeling, as network locations, dynamically provisioned participants whose network endpoint is not specified in advance, but which are configured according to template-based rules that specify network access rules at indeterminate endpoints in the real data communication network, the model being configured to determine access that has been or is actually granted between a template treated as if it can communicate as a fixed endpoint, and the model of the portion of the real data communication network; and
   an output interface device for extracting information from the model;
   for modeling access of the templates to the real data communication network.

2. A method comprising:
   modeling, with a digital processing element having random access memory for nonvolatile digital storage, a real data communication network, the real data communication network including dynamically provisioned devices, the modeling step employing the processing element and the random access memory for nonvolatile storage of a program set, the program set including a network model, a modeled template enforcement device and models of templates modeled as network locations; and
   employing the models of the templates to determine, from the modeling step, access that has been or can be granted by the modeled template enforcement device to the modeled template or template group in the network model with respect to real dynamically provisioned devices whose endpoints in a portion of the real network were not specified prior to the provisioning;
   for modeling access of the dynamically provisioned devices to the real data communication network.

3. The method according to claim 2 wherein said employing step comprises utilizing a template interface added to the modeled template enforcement device as if network traffic originated at the modeled template interface.

4. The method according to claim 2 wherein the modeling step comprises:

obtaining configuration data of template enforcement devices associated with the dynamically provisioned endpoints;

generating interface definitions for each standard interface of the template enforcement device in order to establish a device interface;

and wherein the employing step comprises:

testing for template groups in the template enforcement device, and if none exists, outputting a device description of the user device.

5. The method according to claim 2, wherein if template groups exist in the template enforcement device, associating template groups with access rules; then generating template groups as network interfaces for the modeled template enforcement device, representing template groups as if they are network endpoints connected to the template enforcement device, and producing a device description for the template enforcement device.

6. The method according to claim 5 wherein, after said template group generating step and prior to said testing step, attaching, to the template interfaces, any access rules that were found associated with said template group.

7. The method according to claim 2 wherein the dynamically provisioned endpoints are decomposed into a first dynamic component and a second static component, the first dynamic component being an association of the dynamically provisioned endpoint to the active network endpoint and the geographic and network location of the endpoint, and the second static component being rules applied to the template group.

8. The method of claim 7 wherein the template group comprises rules, the rules being those that are applied to the dynamically provisioned members of the template group such that only a static template or a template group is represented as an interface, in order to cause an appearance that the group of network endpoints is connected at the location of the modeled template enforcement device.

* * * * *